United States Patent [19]
Kammann et al.

[11] Patent Number: 5,930,993
[45] Date of Patent: Aug. 3, 1999

[54] METHOD FOR MONITORING THE EXHAUST GAS CONVERSION RATE OF AN EXHAUST CATALYST FOR AN INTERNAL COMBUSTION ENGINE

[75] Inventors: Uwe Kammann, Warberg; Harald Loeck, Wolfsburg, both of Germany

[73] Assignee: Volkswagen AG, Wolfburg, Germany

[21] Appl. No.: 08/770,876

[22] Filed: Dec. 20, 1996

[30] Foreign Application Priority Data

Dec. 23, 1995 [DE] Germany .......................... 195 48 695

[51] Int. Cl.$^6$ ...................................................... F01N 3/00
[52] U.S. Cl. ................................. 60/274; 60/276; 60/277
[58] Field of Search ............................ 60/274, 277, 276; 73/118.1

[56] References Cited

U.S. PATENT DOCUMENTS

| | | | |
|---|---|---|---|
| 5,339,628 | 8/1994 | Maus et al. | 60/277 |
| 5,357,749 | 10/1994 | Ohsuga et al. | 60/274 |
| 5,419,122 | 5/1995 | Tabe et al. | 60/274 |
| 5,428,956 | 7/1995 | Maus et al. | 60/277 |
| 5,524,433 | 6/1996 | Adamczyk, Jr. et al. | 60/277 |
| 5,584,176 | 12/1996 | Meyer et al. | 60/274 |
| 5,610,844 | 3/1997 | Maus et al. | 60/277 |
| 5,675,967 | 10/1997 | Ries-Mueller | 60/277 |

FOREIGN PATENT DOCUMENTS

| | | |
|---|---|---|
| 0442648 | 8/1991 | European Pat. Off. . |
| 2643739 | 3/1986 | Germany . |
| 3710268 | 10/1988 | Germany . |
| 4211092 | 10/1993 | Germany . |
| 4308894 | 9/1994 | Germany . |
| 4314043 | 11/1994 | Germany . |
| 4341632 | 6/1995 | Germany . |
| 4410225 | 9/1995 | Germany . |

*Primary Examiner*—Thomas E Denion
*Attorney, Agent, or Firm*—Baker & Botts, L.L.P.

[57] ABSTRACT

To improve monitoring of the conversion rate of an exhaust catalyst for an internal combustion engine, the HC emissions are determined downstream of the exhaust catalyst during a predetermined time interval. The time interval starting point and the time interval duration are dependent on the operating mode of the internal combustion engine which is detected, for example, by consideration of the fuel mass flow to the engine over time. The HC sum value thus accumulated during the time interval is compared with a limit value and, when a predetermined difference value results, an error signal is generated.

15 Claims, 5 Drawing Sheets

METHOD FOR MONITORING THE EXHAUST GAS CONVERSION RATE OF AN EXHAUST CATALYST FOR AN INTERNAL COMBUSTION ENGINE

BACKGROUND OF THE INVENTION

This invention relates to methods for monitoring the exhaust gas conversion rate of an exhaust catalyst intended for an internal combustion engine.

Procedures for monitoring the exhaust gas conversion rate of exhaust catalysts are known, for example from U.S. Pat. No. 5,419,122 and German Offenlegungsschrift No. 42 11 092. U.S. Pat. No. 5,419,122 discloses a catalyst monitoring procedure which detects exhaust gas temperatures upstream and downstream of the catalyst. The rate of heat transfer from the exhaust gas to the catalyst material is continually calculated and the catalyst temperature and the rate of change of the catalyst temperature are determined from these calculations.

In addition, the quotient of the rate of heat transfer and the rate of change of the temperature of the catalyst is determined for a specific period of time which is the time from the cold start of the internal combustion engine to the time when the exhaust gas conversion (start-up) temperature of the catalyst is attained. Based on the variation of this quotient over time, a trend is continually determined until the conversion temperature is attained. The time period required to reach the conversion temperature is compared with a threshold value for that time period and, if the threshold value is exceeded, an error signal is produced.

One of the procedures disclosed in Offenlegungsschrift No. 42 11 092 utilizes a temperature estimate for the catalyst which is based on a temperature model. In that procedure, it is assumed for the model that the catalyst is still just usable after reaching the temperature at which the exhaust gas conversion begins and with the heat produced in the conversion. For simulating the temperature behavior of the catalyst, it is initially assumed in that procedure that the heat capacity of the catalyst is known. The amount of heat supplied to the catalyst by the engine is estimated by determining the amount of fuel supplied to the engine and calculating the proportion of the resulting combustion energy which is transferred to the catalyst. In this case, the proportion of combustion energy depends on the engine load condition and the speed of the engine. Consequently, the amount of heat which is supplied to the catalyst is determined during a series of comparatively small time intervals based on the amount of fuel, the load and the speed during each interval. These amounts of heat are summed in order to obtain the total amount of heat which the catalyst receives from the engine from the beginning of the procedure. In addition, the amount of heat dissipated from the catalyst to the environment is estimated. The catalyst temperature estimated using this procedure is subsequently compared with its actual temperature.

The foregoing procedure, which is also intended to be applicable during the driving mode of a vehicle, is utilized only if the catalyst is at approximately ambient temperature at the beginning of the procedure, which can be determined, for example, by comparing the water temperature and the oil temperature of the internal combustion engine with the ambient temperature. From the start of the procedure, a catalyst temperature is estimated with the assistance of a temperature model unit which receives signals corresponding to the engine load, the vehicle speed, fuel injection times, air temperature, air pressure and the octane number of the fuel. This estimated catalyst temperature is compared with a stored comparison temperature. The procedure subsequently determines whether the conversion temperature of the catalyst has already been reached.

SUMMARY OF THE INVENTION

Accordingly, it is an object of the present invention to provide a method for monitoring the exhaust gas conversion rate of an exhaust catalyst for an internal combustion engine which overcomes the disadvantages of the prior art.

Another object of the invention is to provide an improved procedure for monitoring the conversion rate of an exhaust catalyst for an internal combustion engine which has increased diagnostic accuracy and independence from the catalyst coating and its oxygen storing capability and, in addition, is independent of the operating mode of the internal combustion engine after a cold start.

These and other objects of the invention are attained by determining the hydrocarbon (HC) emissions in the exhaust gas downstream from the exhaust catalyst during a specific time interval after cold start of the engine and comparing the hydrocarbon emissions with a preselected limit or comparing an exhaust gas temperature value when the hydrocarbon emissions are in a threshold range with a reference temperature deviation value, and generating an error signal if the preselected limit or the temperature deviation value is exceeded.

In one embodiment of the method according to the invention, following a cold start of the internal combustion engine, the HC emissions downstream of the exhaust catalyst are summed during a specific time interval and this sum value is compared with a predetermined value for that interval. This procedure is based on the recognition that a usable catalyst differs from an unusable catalyst during the specific time interval after a cold start in that a better catalyst emits a lower quantity of hydrocarbons during that time interval than a poorer catalyst. The procedure thus utilizes the fact that the two catalysts do not differ significantly from each other before that time interval and after that time interval, and therefore the exact coordination of the HC emissions determination with the time interval is of extreme importance for the evaluation.

Also important is the starting point for the time interval since the HC emissions are accumulated from this point in time. After every cold start of the internal combustion engine, the beginning of the time interval is fixed in accordance with the operating mode of the engine, i.e., it is considered whether the engine is being operated in a substantially steady state or comparatively dynamically. The operating mode has a considerable influence on the amount of heat introduced into the exhaust gas, which ultimately determines the point in time at which the catalyst conversion temperature is reached. As a result, the starting point of the time interval and also the time duration of the time interval are dependent upon the operating mode of the engine.

Another embodiment of the invention differs from the first embodiment essentially in that, instead of accumulating a sum value for the HC emissions, the current value of the HC emissions is detected continually without summing, and the currently detected HC value is continually compared with a threshold value range for the HC emissions. This threshold value range for the HC emissions represents a reference value for a minimum necessary conversation rate of an operationally warm catalyst. Therefore the continual comparison of the current value with the threshold value leads to a detection of the drop in the HC emissions when the catalyst conversion begins.

The procedure according to this embodiment of the invention then stores the exhaust gas temperature value which occurs at the point in time when the current HC value falls below the reference value. This exhaust gas temperature value is then compared with a reference value for the exhaust gas temperature to provide a temperature difference value and an error signal is triggered if this comparison shows a specific temperature deviation value. The reference value for the exhaust gas temperature applies for a borderline catalyst, which is right at the transition between an acceptable catalyst and a catalyst which is to be considered defective.

This embodiment is advantageously independent to an increased extent of the quality of the HC sensor system used, since no currently acquired values are summed but instead the variation over time of the HC emissions is observed. Furthermore, the triggering of an error signal is brought about by a correlation with the exhaust gas temperature and not directly from the HC values.

In a further advantageous development, the beginning of the time interval is also fixed in the second embodiment by logically combining the exhaust gas temperature values with the catalyst temperature values and by a correction of these values.

Furthermore, the temperature values may be determined absolutely by using temperature sensors or alternatively with the aid of temperature models. In one modification, temperature differences may be determined for the triggering of the error signal, the exhaust gas temperature at the beginning of the time interval being used as the lower temperature reference point and a current temperature difference subsequently being determined from this value and the exhaust gas temperature value when the HC threshold value is attained. This current temperature difference is then compared with a reference temperature difference. In this way, an aged catalyst can be detected reliably in comparison with a fresh catalyst, since its temperature difference is distinctly greater, i.e. it has a relatively high start-up temperature.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
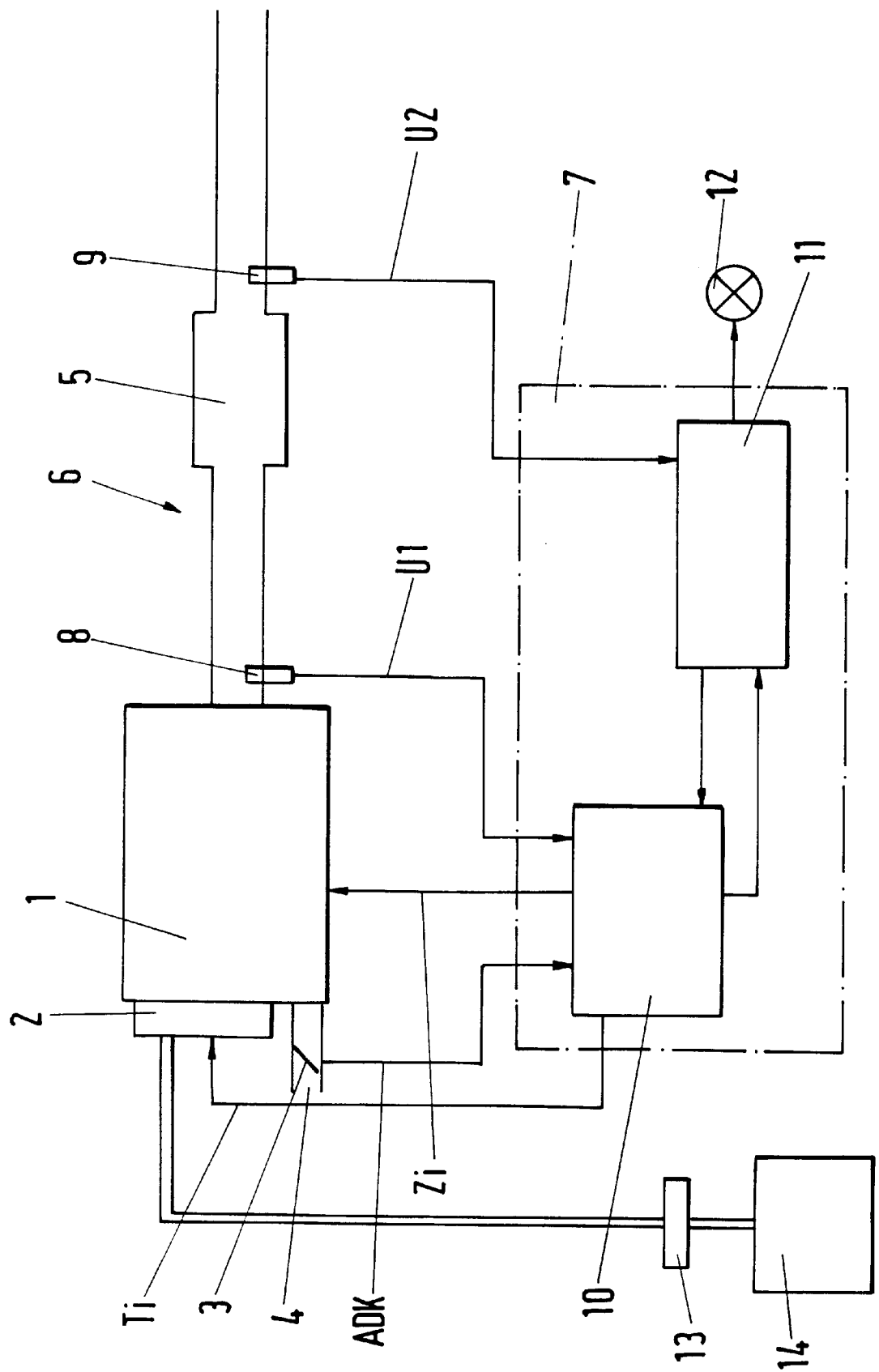
FIG. 1 is a schematic block diagram illustrating the arrangement of a representative embodiment of an internal combustion engine having an exhaust line and an electronic control valve arranged to carry out the invention.

In the typical embodiment of the invention shown in FIG. 1, an internal combustion engine 1 has a series of injection nozzles 2, an air inlet 4 provided with a throttle valve 3, and also an exhaust line 6 provided with an exhaust gas conversion catalyst 5.

An electronic control device 7, constituting an engine control unit, receives signals U1 representing the oxygen content of the exhaust gases from an oxygen sensor 8, located between the internal combustion engine 1 and the exhaust catalyst 5, and also receives signals U2 representing the hydrocarbon content of the converted gases from an HC sensor 9 located downstream from the catalyst 5.

A control circuit 10 in the control device 7 receives the signals U1 and a throttle valve angle signal ADK and provides injection timing signals Ti and also ignition angle signals Zi to the internal combustion engine 1.

The control device 7 also includes a monitoring circuit 11, to which the signals U2 from the HC sensor 9 are supplied and which communicates with the control circuit 10 and, if appropriate, actuates a fault signal lamp 12. This monitoring circuit 11 is explained in more detail in conjunction with FIG. 4.

In the operation of the internal combustion engine 1, fuel from a fuel tank 14 is supplied to the injection nozzles 2 by a fuel pump 13.

Figure 4:
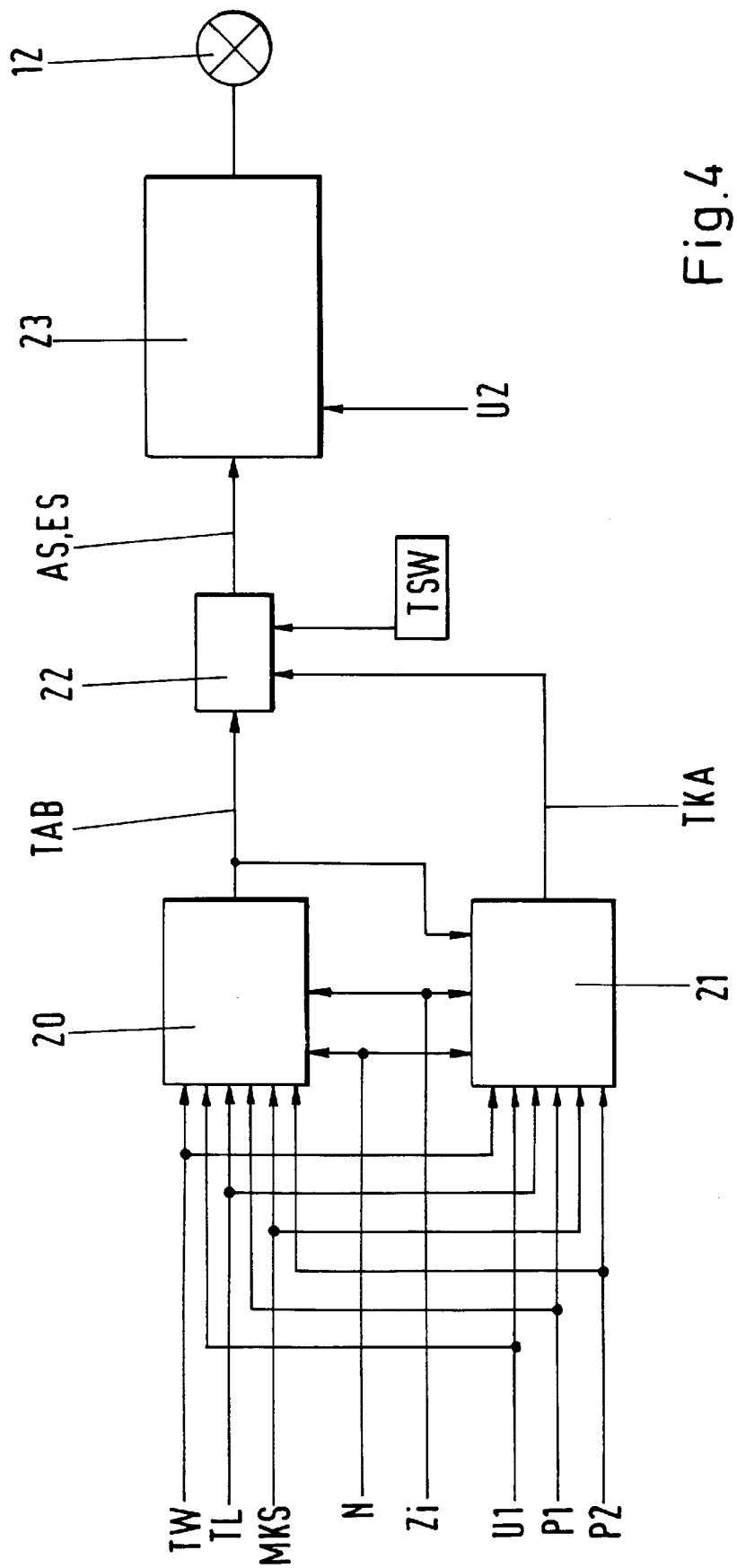
FIG. 4 is a schematic block diagram illustrating a part of the electronic control device shown in FIG. 1.

As shown in FIG. 4, the monitoring circuit 11 comprises an exhaust gas temperature model unit 20, a catalyst temperature model unit 21, a correction unit 22 and an evaluation unit 23.

The input parameters transmitted to the model units 20 and 21 are signals representing the water temperature TW, the air temperature TL, the oxygen concentration detected by the oxygen sensor 8 (U1), the fuel mass flow MKS, the engine speed N, the ignition angle signals Zi and further variables represented by P1 and P2.

In the first embodiment of the invention, the method is carried out as follows:

A cold start of the internal combustion engine 1 is established in a conventional way by plausibility checking of values for cooling water temperature and/or air temperature or oil temperature, etc. After establishing that there is a cold start, first of all the exhaust gas temperature TAB and subsequently the catalyst temperature TKA are estimated with the aid of the exhaust gas temperature model unit 20 and the catalyst temperature model unit 21 using the input parameters described above.

In this case, the value for the exhaust gas temperature TAB is set equal to the value for the water temperature TW and the air temperature TL in the exhaust gas temperature model unit 20 for the beginning of the estimation. At predetermined time intervals, the previously determined value of TAB is continually increased by a temperature difference value, determined by using the variables U1 representing the λ value, the speed N, and the first derivative of the speed, of a motor vehicle equipped with the internal combustion engine 1, the ignition angle signals Zi and the fuel quality in the form of the octane number.

From the foregoing, it should be apparent that the exhaust gas temperature TAB estimated by the exhaust gas temperature model block 20 depends very much on the driving cycle, i.e., on the operating mode of the motor vehicle.

To provide a catalyst temperature TKA for the exhaust catalyst 5 at the same time, the temperature in the region of the reaction portion of the substrate of the catalyst 5 is estimated in the catalyst temperature model unit 21 using the above-mentioned parameters and the exhaust gas temperature TAB.

The catalyst temperature value TKA, like the output of the exhaust gas temperature model unit 20, is fed to the correction unit 22. The correction unit continuously performs a correction of the value TAB, taking into account the value TKA, to determine a temperature start value TST.

When this continually determined start value TST reaches a given temperature threshold value TSW, the correction unit 22 triggers a start signal AS which is supplied to the evaluation unit 23.

The temperature threshold value TSW is an empirically determined temperature value at which it can be assumed that the catalyst 5 is beginning to convert. The value for TSW stored in the control device 7 can be supplemented adaptively by a variable which is based on the catalyst 5 currently used in the motor vehicle.

When the start signal AS is applied to the evaluation unit 23, the processing of a summing algorithm, using further parameters, is commenced to determine the total quantity of hydrocarbons downstream of the catalyst 5 detected during a predetermined time interval by the HC sensor 9.

Taking into account the signals U2 and U1, the HC values are calculated in grams, the exhaust gas mass necessary for this purpose being determined from the fuel mass flow MKS and the air mass or air quantity corresponding to that fuel mass.

New HC values are continually calculated at predetermined time intervals and added to a sum value THC during a time interval dt.

Figure 2:
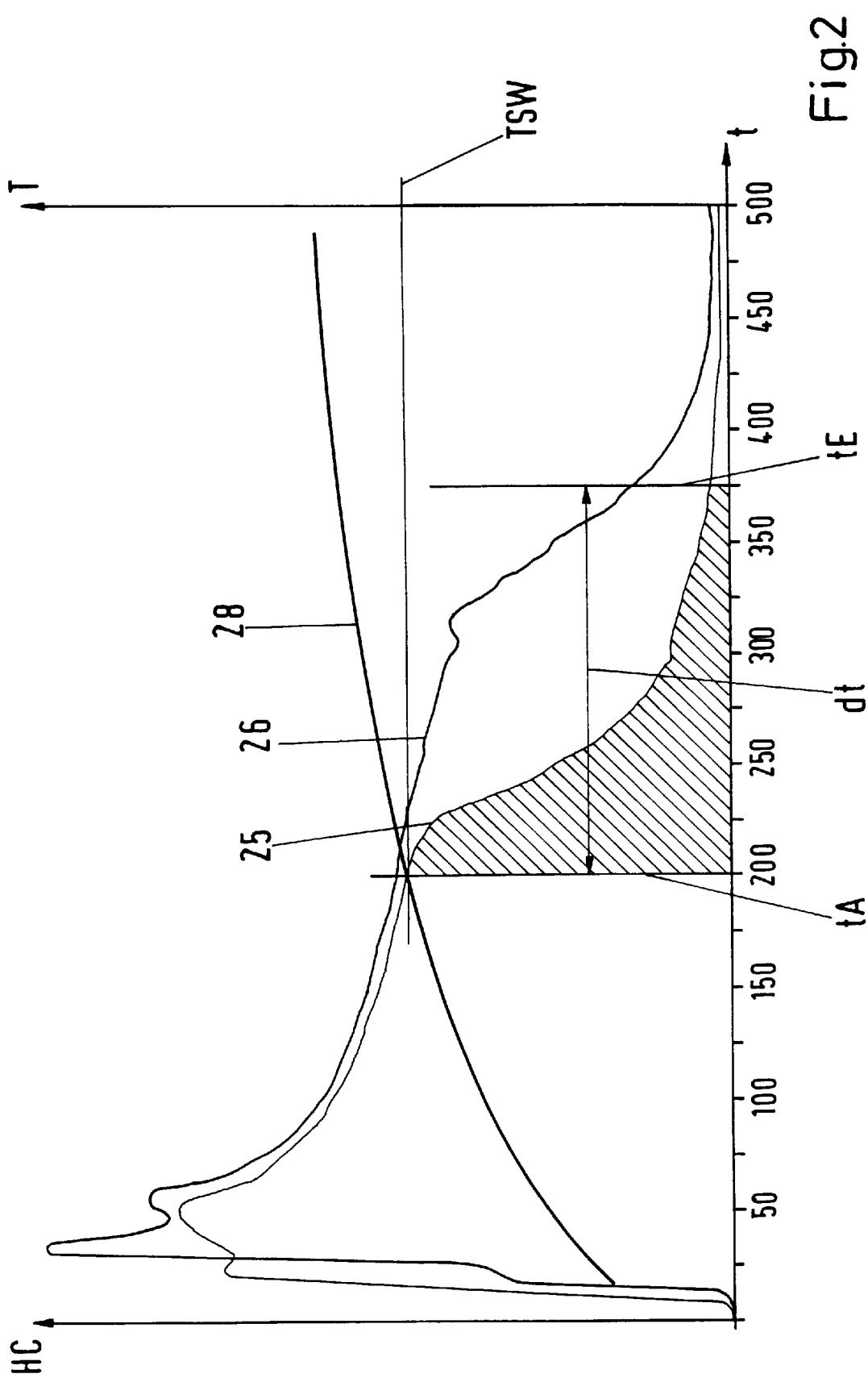
FIG. 2 is a graphical illustration showing the variation over time of HC emissions and exhaust gas temperatures determined downstream from an exhaust catalyst according to a first embodiment of the invention.

FIG. 2 shows the variation of the HC concentration in the exhaust gas, as detected by the HC sensor 9, over time t and the variation over time of the exhaust gas temperature T upstream of the catalyst 5. A curve 25 illustrates the HC emission profile for a new, fully functional exhaust catalyst 5. A curve 26 shows a corresponding profile for an aged catalyst 5. It can be seen that, from a time immediately after a cold start until the starting time tA for the time interval dt, there are no significant differences between the curve profiles 25 and 26. This time range is consequently unsuitable for reliable detection of a possibly damaged catalyst. A curve 28 shows the variation over time of the exhaust gas temperature T upstream of the catalyst 5. After reaching the temperature threshold value TSW, which determines the starting point tA, the HC emission is summed during the time interval dt, as represented by hatch lines in FIG. 2, for the new catalyst below the curve 25.

After starting the internal combustion engine 1 for the first time with a newly installed catalyst 5, a sum value THC1, determined as described above, is stored in the control device 7 as a reference value. When the vehicle is in a workshop, this value can be read out from the control devices for diagnostic purposes and used to assess the quality of the catalyst being used.

During the service life of the combination of the internal combustion engine 1 and the exhaust catalyst 5, the conversion properties of the catalyst deteriorate, one of the effects being that the temperature required for conversion increases. As a result, harmful exhaust emissions increase.

The curve 26 shown in FIG. 2 represents the typical emission profile downstream of such an aged catalyst. The area corresponding to the sum value THC below the curve profile 26 within the time interval dt is significantly greater than that below the curve 25.

The summing of the HC emissions is ended when the correction unit 22 emits a stop signal ES to the evaluation unit 23 at a time tE at the end of the time interval dt. The end point of the time interval is determined by the starting point tA and the duration of the time interval dt. The time interval dt in turn is made up of an empirically determined preset average value tM and a correction value tK which is dependent on operating parameters of the internal combustion engine 1.

Figure 3:
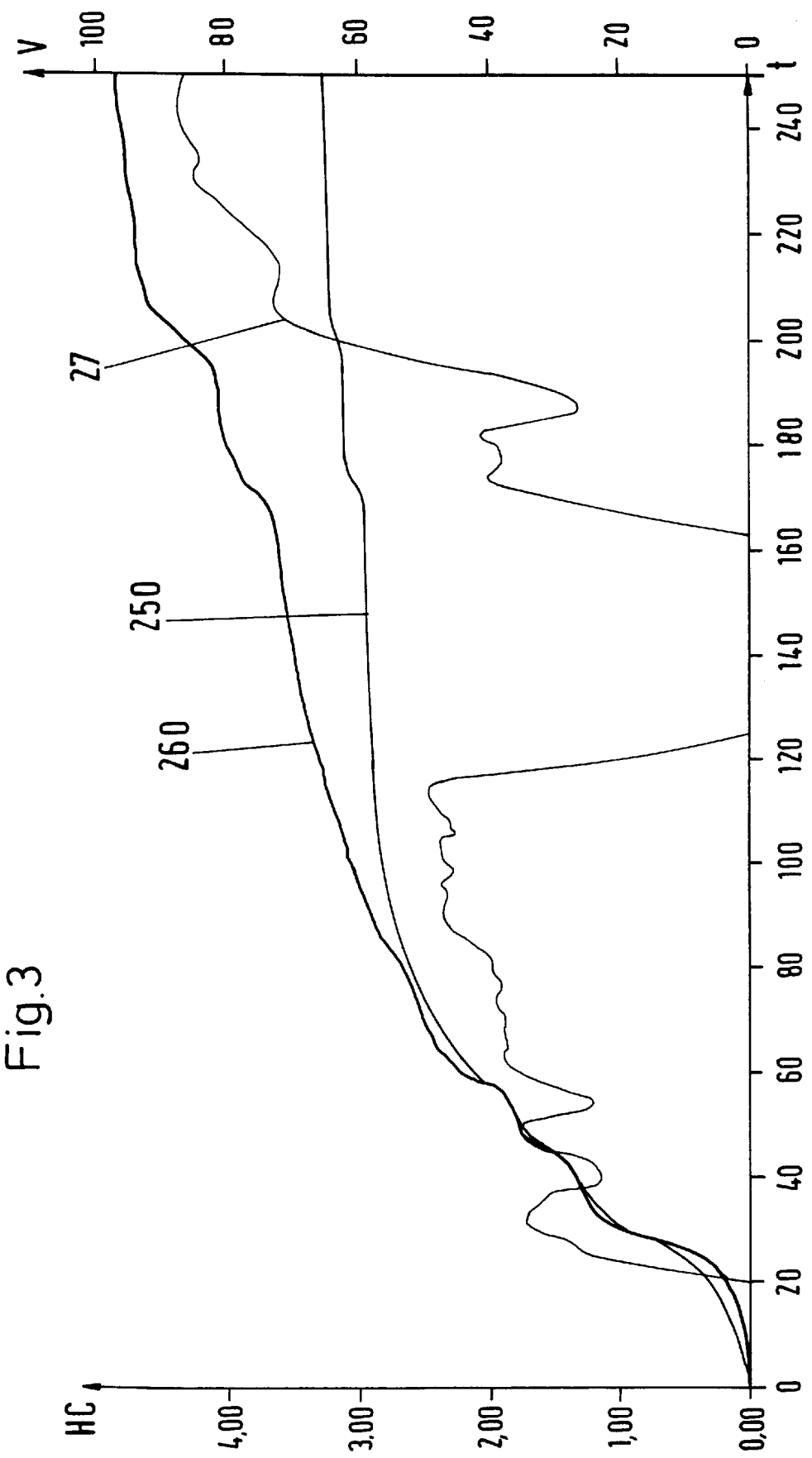
FIG. 3 is a graphical representation showing the variation over time of the sum of the HC emissions represented in FIG. 2.

The parameters used for the determination of the exhaust gas temperature values TAB, the catalyst temperature values TKA and the correction value tK are those which, in particular, take into account the driving mode with which the motor vehicle is operated. As a result, an individual driving cycle is reduced to a standardized driving cycle and can be compared with conventional standardized driving cycles. Such cycles are prescribed by legislation in various countries around the world, for example as the so-called FTP cycle or the MVEG cycle. These prescribed cycles have a precisely defined speed profile over time, i.e., the driving cycle is exactly specified. FIG. 3 shows the HC emission values accumulated for such an FTP cycle over time for a fresh catalyst by the curve 250 and for an aged catalyst by the curve 260. The prescribed speed profile is represented by the curve 27 in conjunction with the ordinate shown on the right for the vehicle speed V. The influence of the driving cycle-dependent parameters, such as for example the fuel mass flow MKS, is manifested by decreasing the time interval dt with increasing values for the fuel mass flow MKS per unit of time. This is advantageous to the extent that the energy introduced through the increased fuel mass flow MKS heats up the catalyst 5 more quickly and, as a consequence of this, the curve profile 26 of FIG. 2 is shifted to the left in the region of the time window because, if the original time interval dt were retained, the effect of the insignificantly different section of the curves 25 and 26 after the end point tE in FIG. 2 would become increasingly noticeable.

For a further improvement in the accuracy of the procedure, the starting point tA can be shifted to an earlier time as a function of the driving cycle-dependent parameters, for example with an increasing gradient of the fuel mass flow profile MKS.

In the evaluation unit 23, a limit value GHC for the sum value THC is stored. This limit value GHC can be set according to the requirements of each country, for example, and represents a catalyst 5 considered to be just acceptable according to those requirements. If the comparison of THC and GHC shows that a specific deviation value DHC has been reached, an error signal is triggered, which, after occurring once or more than once, actuates the fault signal lamp 12.

The method of the invention advantageously provides better diagnostic accuracy than previously known procedures and is, in addition, independent of the catalyst coating. Furthermore, a lead-poisoned catalyst can also be detected. Of decisive importance for the method according to the invention is the setting of the start signal AS and the duration of the time interval dt.

The method according to the invention is not necessarily dependent on estimating the exhaust gas temperature and the catalyst temperature by using the model units 20 and 21. Instead, these temperatures may be measured using sensors located at the catalyst and in the exhaust gas path.

A second embodiment of the invention is explained in more detail with reference to FIG. 5. This embodiment is similar to the first embodiment but, after a cold start of the internal combustion engine 1, the current value AHC of the HC emissions present downstream of the exhaust catalyst 5 is detected continually for the duration of a specific time interval after the cold start. The resulting HC emission profile is represented by the curve 26. At the same time, the exhaust gas temperature value TAB upstream of the catalyst 5, represented by the curve 28, is detected.

Figure 5:
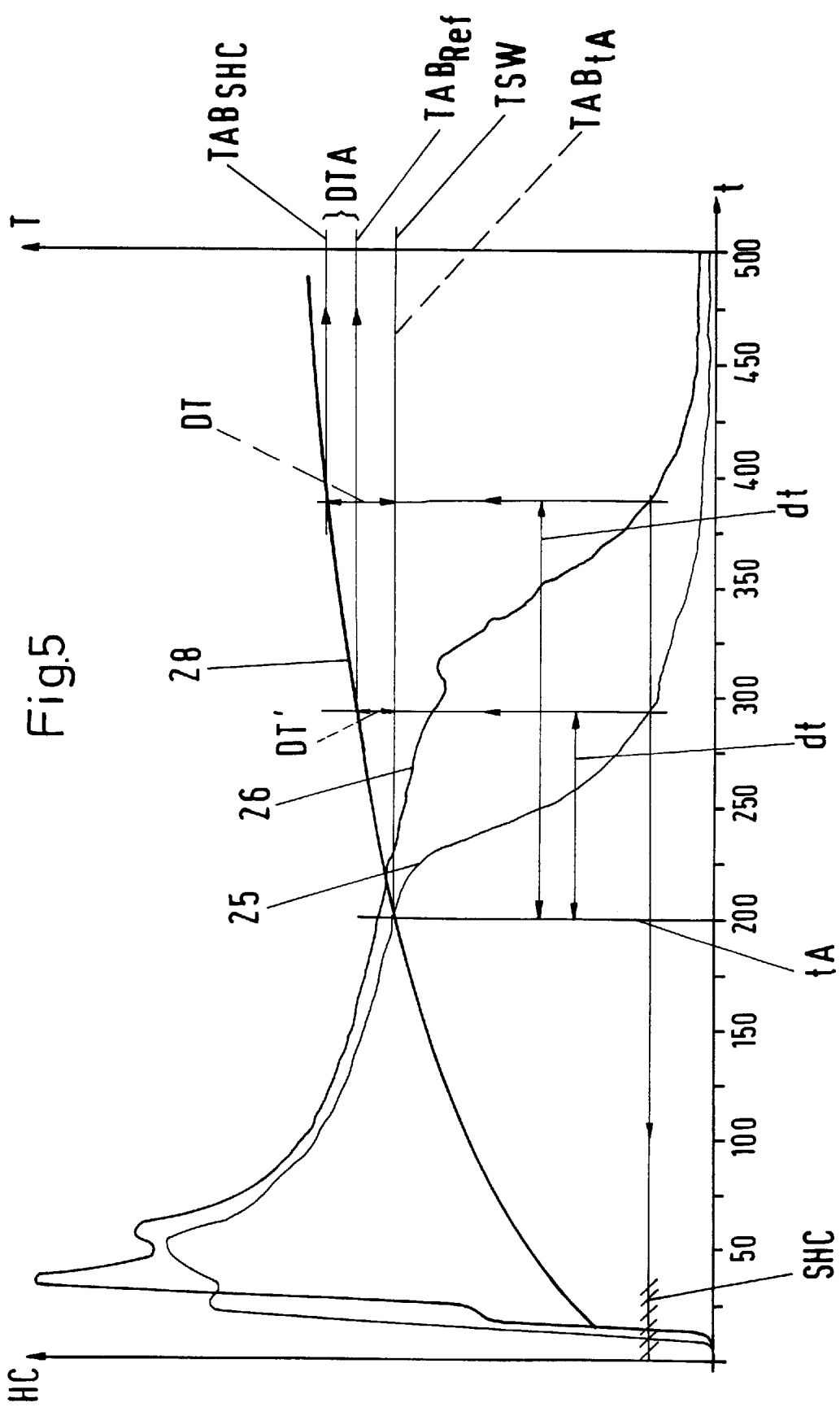
FIG. 5 is a graphical representation illustrating the variation over time of the HC emissions and exhaust gas temperatures determined downstream of an exhaust catalyst according to a second embodiment of the invention.

Drawn parallel to the time axis in FIG. 5 is a line SHC representing a threshold value of HC emissions based on a fresh catalyst curve (i.e., curve 25). This line represents an average value of a threshold value range which is indicated only at the left-hand end of the figure. The threshold value range SHC is stored in the control device 7. In a further step, the method then compares the currently detected value AHC with the threshold value range SHC. If the threshold value range SHC is reached by the HC curve profile 26 for the currently used catalyst 5, the exhaust gas temperature value $TAB_{SHC}$ occurring at that time is stored.

Subsequently, that exhaust gas temperature value $TAB_{SHC}$ is compared with a reference value $TAB_{Ref}$ for the exhaust gas temperature value. This reference value may be the exhaust gas temperature value TAB which occurs when the threshold value SHC is attained with a fresh exhaust catalyst 5 according to curve profile 25. In a subsequent procedural step, these two exhaust gas temperature values $TAB_{SHC}$ and $TAB_{Ref}$ are compared with each other and an error signal is triggered if a predetermined temperature difference value DTA is reached. As with the first embodiment, the exhaust gas temperature values TAB may be determined directly using temperature sensors, so that the temperature comparison in this step is a comparison of measured values. Alternatively, as in the first embodiment, the exhaust gas temperature values TAB and catalyst temperature values TKA may be estimated by using the model units 20 an 21, respectively.

While the beginning of the time interval dt at the point in time tA is determined in this embodiment in the same way as in the first embodiment, the duration of the time interval dt is fixed with respect to its end point tE by the measured HC value reaching the threshold value SHC, i.e., by the points of intersection of the curves 25 and 26 with the line representing the value SHC.

As represented by dashed auxiliary lead lines, the final comparison of the exhaust gas temperature values may also be carried out as a comparison of temperature differences. For this purpose, at the starting point tA, the then present exhaust gas temperature value $TAB_{tA}$ is stored and, in the last procedural step, the temperature difference DT between exhaust gas temperature value $TAB_{tA}$ and the exhaust gas temperature value $TAB_{SHC}$ is determined. Subsequently, this temperature difference DT is in turn compared with a reference value of the exhaust gas temperature $TAB_{Ref}$, this reference in this case being a temperature difference DT' for the fresh exhaust catalyst 5.

As is clearly evident from FIG. 5, the temperature difference DT for the aged exhaust catalyst 5 is greater than the corresponding temperature difference DT' for the fresh catalyst. This means that the conversion of the aged catalyst does not begin until higher temperatures are reached, i.e., later in the warm-up period. Exhaust catalysts whose start-up performance and conversion rate change abruptly, i.e., those which cannot be observed over an extended period of time, may be regarded as special cases. Because of unpredictable influences, a catalyst may, for example, deteriorate between two occasions on which the internal combustion engine is operated, separated by a shutdown, in such a way that the emissions do not at any point in time fall below the threshold value SHC. In such special cases, the exhaust catalyst is considered to be defective without reference to temperature values.

This second embodiment thus substitutes the quantitative observation of the HC emissions according to the first procedure with a qualitative observation of the variation over time of the HC emissions. The evaluation ultimately takes place on the basis of the variation over time of the curve 25, i.e. on the basis of the evaluation of the curve slope after reaching the catalyst starting temperature. However, this variation over time of the HC emissions is used only indirectly for the subsequent triggering of an error signal, since the temperature values are observed, or stored and subsequently evaluated, at specific points in time.

Although the invention has been described herein with reference to specific embodiments, many modifications and variations therein will readily occur to one skilled in the art. Accordingly, all such variations and modifications are included within the intended scope of the invention.

We claim:

1. A method for monitoring the conversion rate of an exhaust conversion catalyst for an internal combustion engine having an electronic control device comprising the steps of:

(a) cold starting the internal combustion engine;
    (b) summing HC emissions present in the exhaust gas from the engine at a location downstream of the exhaust catalyst during a specific time interval after the cold start and storing the sum value of the HC emissions,
    (c) comparing the sum value with an HC emission limit value to produce a difference value, and
    (d) triggering an error signal if the comparison in step (c) shows that a specific difference value has been reached.

2. A method according to claim 1 wherein the sum value determined in step (b) the first time the internal combustion engine is operated with an exhaust conversion catalyst is stored as a reference value.

3. A method according to claim 1 wherein the determination of the beginning of the time interval includes the steps of:

(a) determining an exhaust gas temperature value;
    (b) determining a catalyst temperature value;
    (c) correcting the exhaust gas temperature value using the catalyst temperature value to form a temperature start value; and
    (d) triggering a start signal for the starting point if the temperature start value has reached a predetermined temperature threshold value.

4. A method according to claim 3 wherein the exhaust gas temperature value and the catalyst temperature value are determined by corresponding temperature sensors.

5. A method according to claim 3 including the steps of estimating the exhaust gas temperature value in an exhaust gas temperature model unit of the electronic control device as a function of parameters of the internal combustion engine, and estimating the catalyst temperature value in a catalyst temperature model unit of the electronic control device.

6. A method according to claim 4 including supplying signals from an HC sensor to an evaluation unit of the electronic control device during the time interval and adding thereto the sum value.

7. A method according to claim 6 wherein a stop signal for the end point is triggered in the electronic control device when a time interval has elapsed which is made up of a preset average value and a correction value which are dependent on operating parameters of the internal combustion engine.

8. A method according to claim 7 wherein the operating parameter which are detected as parameters of the internal combustion engine are dependent on a vehicle driving cycle.

9. A method according to claim 8 in which the time interval is shortened with increasing values for fuel mass flow to the internal combustion engine.

10. A method according to claim 8 wherein the starting point is earlier with increasing values for fuel mass flow to the internal combustion engine.

11. A method for monitoring the conversion rate of an exhaust conversion catalyst for an internal combustion engine having an electronic control device comprising the steps of:

(a) cold starting the internal combustion engine;

(b) detecting of the current value of the HC emissions present in the exhaust gas from the engine at a location downstream of the exhaust conversion catalyst continually for the duration of a specific time interval after the cold start;

(c) comparing the current value of the HC emissions continually with a threshold value range;

(d) storing the exhaust gas temperature value attained when (c) the value of the HC emissions reaches the threshold value range and comparing the stored exhaust gas temperature value with a reference value for the exhaust gas temperature value to produce a temperature difference value; and (e) triggering an error signal if the comparison in step (d) produces a temperature difference value which exceeds a predetermined value.

12. A method according to claim 11 wherein the beginning of the specific time interval is determined by:

(a) determining an exhaust gas temperature value;

(b) determining a catalyst temperature value; and (c) correcting the exhaust gas temperature value with the catalyst temperature value to form a temperature start value, thereby triggering a start signal for the starting point of the specific time interval if the temperature start value has reached a predetermined temperature threshold value.

13. A method according to claim 12 wherein the exhaust gas temperature value and the catalyst temperature value are determined by corresponding temperature sensors.

14. A method according to claim 12 including the steps of estimating the exhaust gas temperature value in an exhaust gas temperature model unit of the electronic control device as a function of parameters of the internal combustion engine, and estimating the catalyst temperature value in a catalyst temperature model unit of the electronic control device.

15. A method according to claim 11 wherein the starting point of the specific time interval is advanced with increasing value for fuel mass flow to the internal combustion engine.

* * * * *